United States Patent [19]
Gibbs et al.

[11] Patent Number: 6,006,894
[45] Date of Patent: Dec. 28, 1999

[54] LOW VEIN MOBILE BRIDGE CARRIER HYDRAULIC HAULAGE SYSTEM

[75] Inventors: James D. Gibbs, Harrogate; Gary S. Smith, Cumberland Gap, both of Tenn.

[73] Assignee: CBJ Plating & Machine of Tennessee, Co., Harrogate, Tenn.

[21] Appl. No.: 09/293,071

[22] Filed: Apr. 16, 1999

[51] Int. Cl.[6] ..................................................... B65G 15/26
[52] U.S. Cl. .......................... 198/588; 198/594; 198/303; 198/861.2; 198/315; 198/316.1
[58] Field of Search ..................................... 198/588, 594, 198/303, 514, 861.3, 313, 318, 315, 316.1, 861.2

[56] References Cited

U.S. PATENT DOCUMENTS

| | | | |
|---|---|---|---|
| 1,908,434 | 5/1933 | Madeira | 198/588 |
| 2,196,659 | 4/1940 | Cartlidge | 198/594 X |
| 2,269,078 | 1/1942 | Cartlidge | 198/861.2 |
| 2,577,926 | 12/1951 | Stiles | 198/861.3 |
| 2,646,871 | 7/1953 | Lundquist | 198/861.2 |
| 2,778,477 | 1/1957 | Lundahl | 198/316.1 X |
| 2,815,114 | 12/1957 | Tracy | 198/861.2 |
| 2,856,061 | 10/1958 | Seigle et al. | 198/861.2 |
| 3,134,479 | 5/1964 | Daily | 198/861.2 |
| 3,134,480 | 5/1964 | Loosli | 198/861.3 |
| 3,623,597 | 11/1971 | Arndt | 198/316.1 |
| 4,183,585 | 1/1980 | Brennan . | |
| 4,359,154 | 11/1982 | Temme . | |
| 4,783,171 | 11/1988 | Zimmerman | 198/313 |
| 5,156,497 | 10/1992 | Gaskins . | |
| 5,285,866 | 2/1994 | Ackroyd . | |
| 5,312,206 | 5/1994 | Gaskins . | |
| 5,341,920 | 8/1994 | Riffe . | |
| 5,584,611 | 12/1996 | Clonch . | |
| 5,664,932 | 9/1997 | Clonch . | |

*Primary Examiner*—Robert P. Olszewski
*Assistant Examiner*—Steven B. McAllister
*Attorney, Agent, or Firm*—Pitts & Brittian, P.C.

[57] ABSTRACT

A low profile, wide belt mobilized bridge carrier is used in low vein mining operations. The mobilized bridge carrier of the present invention includes a carrier frame that carries the propulsion system and that supports the receiving boom, the discharge boom, the cab assembly and the canopy. The preferred mobilized bridge carrier is track propelled, and includes at least a pair of crawler track assemblies which are actuated by an electrically operated hydraulic motor. The receiving boom and the discharge boom are pinned together and each are pivotally mounted on carrier frame at a main pivot point. The carrier frame is of reinforced construction. The receiving boom and discharge boom of the present invention include low profile side panel assemblies which allow the present mobilized bridge carrier to be used in "low vein" mining applications. In order to compensate for any inherent loss of strength in the receiving boom that results from lowering the profile to accomplish its purpose of operating within low veins, the present receiving and discharge booms incorporate certain novel reinforcements, including inside reinforcement plates that extend substantially throughout the length of the booms and which is constructed of a plate of T1 steel approximately three/fourths of an inch to approximately one inch thick continuously welded to the interior of each of the sides of the booms.

19 Claims, 12 Drawing Sheets

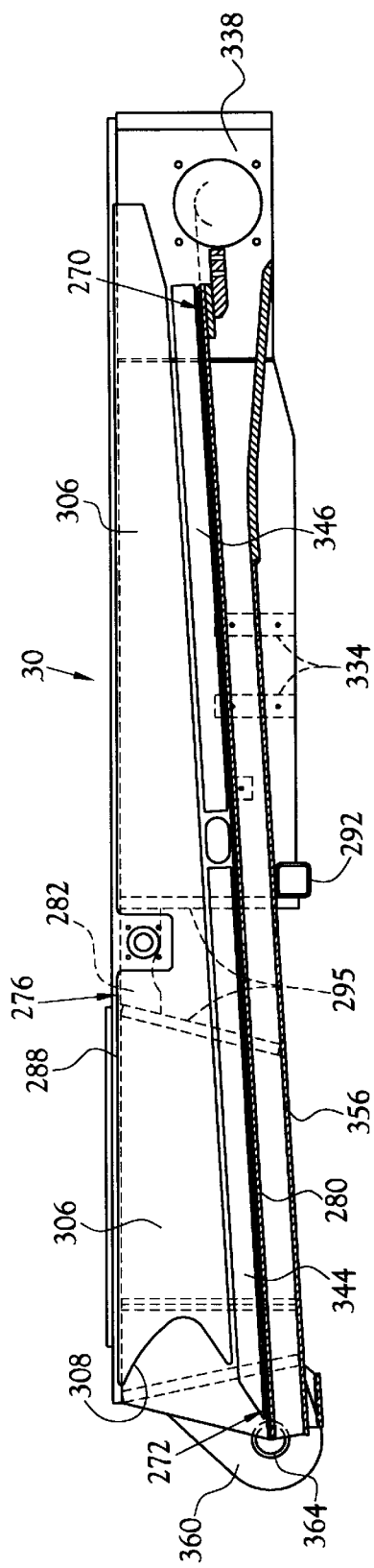
Fig.15
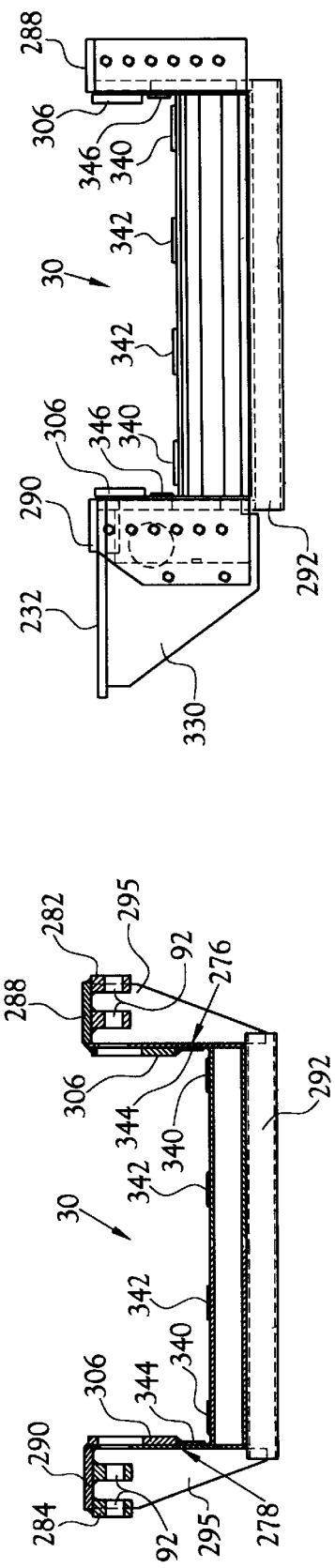
Fig.17
Fig.16

LOW VEIN MOBILE BRIDGE CARRIER HYDRAULIC HAULAGE SYSTEM

TECHNICAL FIELD

This invention relates to hydraulic mining equipment. More particularly, it relates to a low vein mobile bridge carrier.

BACKGROUND ART

In the field of underground continuous coal mining, it is well known to have a machine, known as a miner, enter a coal seam, cut the coal free, and discharge the loose coal onto a bridge conveyor. In this regard, in a typical system that utilizes a mobilized bridge carrier (MBC) the miner cuts the coal and conveys the coal to the bridge, which is attached on a pin disposed at the end of the miner's conveyor and has a catch pan beneath the dump end of the miner's conveyor. The bridge then conveys the mined coal to the dump end of the bridge where it is discharged into a hopper type dolly running along the top of the receiving conveyor, or boom, of the MBC. A conveyor on the MBC conveys the mined coal to the discharge boom which discharges the mined coal onto the receiving end of the next bridge. This sequence is repeated until the mined coal reaches a portable belt conveyor structure. The portable belt conveyor conveys the mined coal to the main belt line, which in turn conveys the mined coal to the opening of the mine. A typical coal mining operation uses a series of four bridge conveyors and three MBC units. This system permits non-stop haulage of the material from the face of the mine where it is cut to the outside of the mine to be hauled away from the mine.

Those skilled in the art will appreciate that coal seams present various heights. Thus, it is well known in the art to have both normal height bridges and bridge carriers for seams in excess of fifty inches in height as well as low profile bridges and bridge carriers for coal seams known as "low veins" that are typically between 30" and 50" in height. Bridges and bridge carriers also typically have standard widths. In this regard, certain bridge carriers have a 30" wide belt while other bridges have a 36" wide belt. Those skilled in the art appreciate that a 36" wide belt will transport a greater volume of mined coal per unit of time than will a 30" wide belt. However, presently available low vein MBC systems only have a belt width of 30 inches. This width limits the rate at which coal may hauled out of the mine. A miner can cut coal at rate faster than the haulage system can remove it. Accordingly, the miner unit cuts some coal and then remains idle until the haulage system catches up resulting in down time for the miner. This down time decreases the mines production, in terms of volume of coal extracted per a given unit of time, and results in inefficient usage of the miner. This inefficiency is exacerbated by the relatively high cost of the miner unit.

And, those skilled in the art will recognize that present construction methods do not give the booms of the MBC sufficient strength and rigidity to support the increased coal weight on the booms of the MBC that results from an increased belt width.

Known art in the field of mining equipment includes the devices disclosed in the following U.S. Patents:

| U.S. Pat. No. | Inventor(s) | Issue Date |
|---|---|---|
| 4,183,585 | Brennan | Jan. 15, 1980 |
| 5,156,497 | Gaskins | Nov. 25, 1991 |
| 5,285,866 | Ackroyd | Feb. 15, 1994 |
| 5,341,920 | Riffe | Aug. 30, 1994 |
| 5,312,206 | Gaskins | May 17, 1994 |
| 5,584,611 | Clonch | Dec. 17, 1996 |
| 5,664,932 | Clonch et al. | Sep. 9, 1997 |

What has heretofore been missing from the art is a low profile mobilized bridge carrier having a wide belt for greater haulage capacity than presently available systems.

Therefore, it is an object of the present invention to provide a low profile mobilized bridge carrier having a wide belt for greater haulage capacity than presently available systems.

It is another object of the present invention to provide a low profile mobilized bridge carrier having low profile reinforced booms.

Other objects and advantages of the invention over the prior art will become apparent to those skilled in the art upon reading the detailed description together with the drawings which are described below.

DISCLOSURE OF THE INVENTION

In accordance with the various features of this invention, a mobilized bridge carrier offering advantages over the prior art is provided. It is known in the art that standard mobilized bridge carriers consist of a frame, a receiving boom for receiving mined coal and a discharge boom for discharging mined coal. The mobilized bridge carrier is used in conjunction with subterranean mining operations. In this regard, in a state of the art mining operation, a miner cuts the coal and conveys the coal to a bridge attached at the end of the miner's conveyor. The bridge conveys the mined coal to the dump end of the bridge which is supported by a dolly running along the top of the receiving boom of the mobilized bridge carrier. The mined coal is then dumped onto the receiving boom of the mobilized bridge carrier. A conveyor on the mobilized bridge carrier conveys the mined coal to the discharge boom which discharges the mined coal onto the catch pan at the receiving end of the next bridge. This sequence is repeated until the mined coal reaches a portable belt conveyor structure. The portable belt conveyor conveys the mined coal to the main belt line, which in turn conveys the mined coal to the opening of the mine. A typical coal mining operation uses a series of four bridge conveyors and three mobilized bridge carriers.

The mobilized bridge carrier of the present invention includes a carrier frame that carries the propulsion system and that supports the receiving boom, the discharge boom, the cab assembly and the canopy. The preferred mobilized bridge carrier is track propelled, and includes at least a pair of crawler track assemblies which are actuated by an electrically operated hydraulic motor. The carrier frame supports both the receiving boom and the discharge boom. The receiving boom and the discharge boom are pinned together and each are pivotally mounted on carrier frame at a main pivot point. The receiving boom and the discharge boom are each actuated by hydraulic cylinders, which are anchored on the frame and which include rams secured to the booms. The conveyor assembly conveys coal received by the receiving boom along the length of mobilized bridge carrier to the dumping end of the discharge boom. The conveyor assembly includes a plurality of conveyor members that are driven by at least a pair of endless chain members. Chain members are driven by a second motor connected by a fluid drive transmission that drives an axle which carries chain drive sprockets engaged with each conveyor chain member.

The carrier frame for the mobilized bridge carrier includes a bed plate and first and second drive boxes. The bed plate is provided with a clean-out hole. The drive boxes house the crawler track assemblies. Also, the carrier frame supports the motor, the electrical box, and the oil tank. The receiving boom and the discharge boom are supported on the carrier frame by right and left hand lift and pivot lug bars. The receiving boom and the discharge boom are secured to main pivot point by six-bolt mains which engages and secures the boom pivot pin. The receiving boom and the discharge boom are further supported by inside pivot lugs. As mentioned above, hydraulic cylinder engages the carrier frame at anchor point which is supported by the receiving boom lift lugs. Similarly, hydraulic cylinder engages carrier frame at anchor point which is supported by discharge boom lift lugs.

In order to compensate by the stress imposed on the bed plate beneath the lift and pivot lug bars and the inside pivot lugs, a brace plate is welded to the underside of bed plate proximate the position of the lift and pivot lug bars and the inside pivot lugs.

The receiving boom is pivotally connected to the discharge boom. In order to allow a greater range of downward pivoting of the receiving boom, the distal end and the pivot end are, preferably, disposed to one another at a substantially obtuse angle. The receiving boom provides a channel, or trough, approximately thirty-six inches wide through which coal is conveyed by means of the conveyor. However, unlike conventional thirty-six inch mobilized bridge carriers, the receiving boom of the present invention includes low profile side panel assemblies which allow the present mobilized bridge carrier to be used in "low vein" mining applications. In order to compensate for any inherent loss of strength in the receiving boom that results from lowering the profile to accomplish its purpose of operating within low veins, the present receiving boom incorporates certain novel reinforcements.

The hydraulic cylinder anchor point for the receiving boom is defined by right hand and left hand lift lugs. The lift lugs are carried by right hand and left hand stiffener plates, which strengthen the side panel assemblies. To further strengthen the side panel assemblies and prevent the side panel assemblies from torquing outward when the hydraulic cylinders are extended, a cross brace is provided. The cross brace reinforces the right and left hand stiffener plates and is disposed directly above the cylinder anchor point. Further reinforcement of the lift lugs is provided by a pair of gussets associated with each of lift lugs. It is known that in conventional booms, a stress point is created forward of the lift lugs when the boom is lifted by the hydraulic cylinder. In order to distribute this stress over a greater surface area and reduce, if not eliminate, the onset of metal fatigue, each of the side panel assemblies of the receiving boom of the present invention incorporates an additional gusset that intersects this stress point, a reinforcement plate having an arcuate upper edge, and inside reinforcement plate. The inside reinforcement plate extends from proximate the pivot end of the receiving boom to a point proximate the end of the dolly rail. In the preferred embodiment, inside reinforcement plate is approximately three/fourths of an inch to approximately one inch thick plate of T1 steel continuously welded to the interior of each of the side panel assemblies.

In order to prevent excessive wear to the top conveyor plate by the conveyor members, outer floor wear strips and inner floor wear strips are disposed on the upper surface of the top conveyor plate of the receiving boom and the discharge boom. Side wear strips reduce frictional wear to the inside of the side panel assemblies of the receiving boom and the discharge boom. In the preferred embodiment, the wear strips are three inches wide and one-quarter of an inch thick and are constructed of T1 steel. Further, in order to protect the distal end of the receiving boom, a pair of side deflector bars and associated diagonal deflector bars, an end deflector bar and a bottom skid plate are provided. A bottom return plate serves to protect chain members and conveyor members as they travel beneath the top conveyor plate from the discharge end of the discharge boom to the distal end of the receiving boom.

As mentioned above, the receiving boom and the discharge boom are pinned together and each are pivotally mounted on carrier frame at the main pivot point. In this regard, the receiving boom is provided with hinge plates which are in spaced relation from one another secured proximate the pivot end of the receiving boom. The hinge plates are each provided with registering hole members and a hardened steel hinge bushing. The hardened steel hinge bushing receives the boom pivot pin. Proximate the hinge plates are the spill plates. The spill plates assist in keeping the mined coal within the trough during the transition from the receiving boom to the discharge boom.

As does the receiving boom, the discharge boom also provides a channel, or trough, approximately thirty-six inches wide through which coal is conveyed by means of the conveyor. In this regard, the discharge boom also includes reinforced low profile side panel assemblies, which are in spaced relation. The discharge boom has a floor that is defined by a top conveyor plate.

The discharge boom includes lift lugs that are carried by right hand and left hand stiffener plate, which strengthen side panel assemblies in a manner similar to the stiffener plates of the receiving boom. Further reinforcement of the lift lugs of the discharge boom is provided by a pair of gussets associated with each of lift lugs. Due to its shorter length, and therefore less torque, the discharge boom is not subjected to as much stress as is the receiving boom, when the discharge boom is lifted by its hydraulic cylinder. However, in order to provide additional reinforcement to the discharge boom a cross tube is provided. Similar to the receiving boom, the discharge boom includes inside reinforcement plates that reinforce the low profile side panel assemblies, and that are is rigidly fixed to the interior surface of each of the low profile side panels. The inside reinforcement plate is approximately three/fourths of an inch to approximately one inch thick plate of T1 steel continuously welded to the interior of each of the side panel assemblies of the discharge boom. A bottom return plate on the discharge boom serves to protect chain members and conveyor members as they travel beneath the top conveyor plate from the discharge end of the discharge boom to the distal end of the receiving boom.

The discharge boom is also provided with hinge plates which are in spaced relation from one another secured proximate the pivot end of the discharge boom. The hinge plates of the receiving boom are also each provided with registering hole members and a hardened steel hinge bushing received therein. The hardened steel hinge bushing receives the boom pivot pin. In the preferred embodiment, the spill plates carried by the receiving boom are disposed so as to be positioned within the boundary of the side panel assemblies of the discharge boom.

BRIEF DESCRIPTION OF THE DRAWINGS

The above-mentioned features of the invention will become more clearly understood from the following detailed description of the invention read together with the drawings in which:

FIG. 15 illustrates a cross sectional view of the discharge boom taken at line 15—15 in FIG. 13.

FIG. 16 illustrates a cross sectional view of the discharge boom taken at line 16—16 in FIG. 14.

FIG. 17 illustrates an end elevation view of the discharge boom in which the yoke plate assembly has been removed for clarity of view.

Best Mode for Carrying out the Invention

Figure 1:
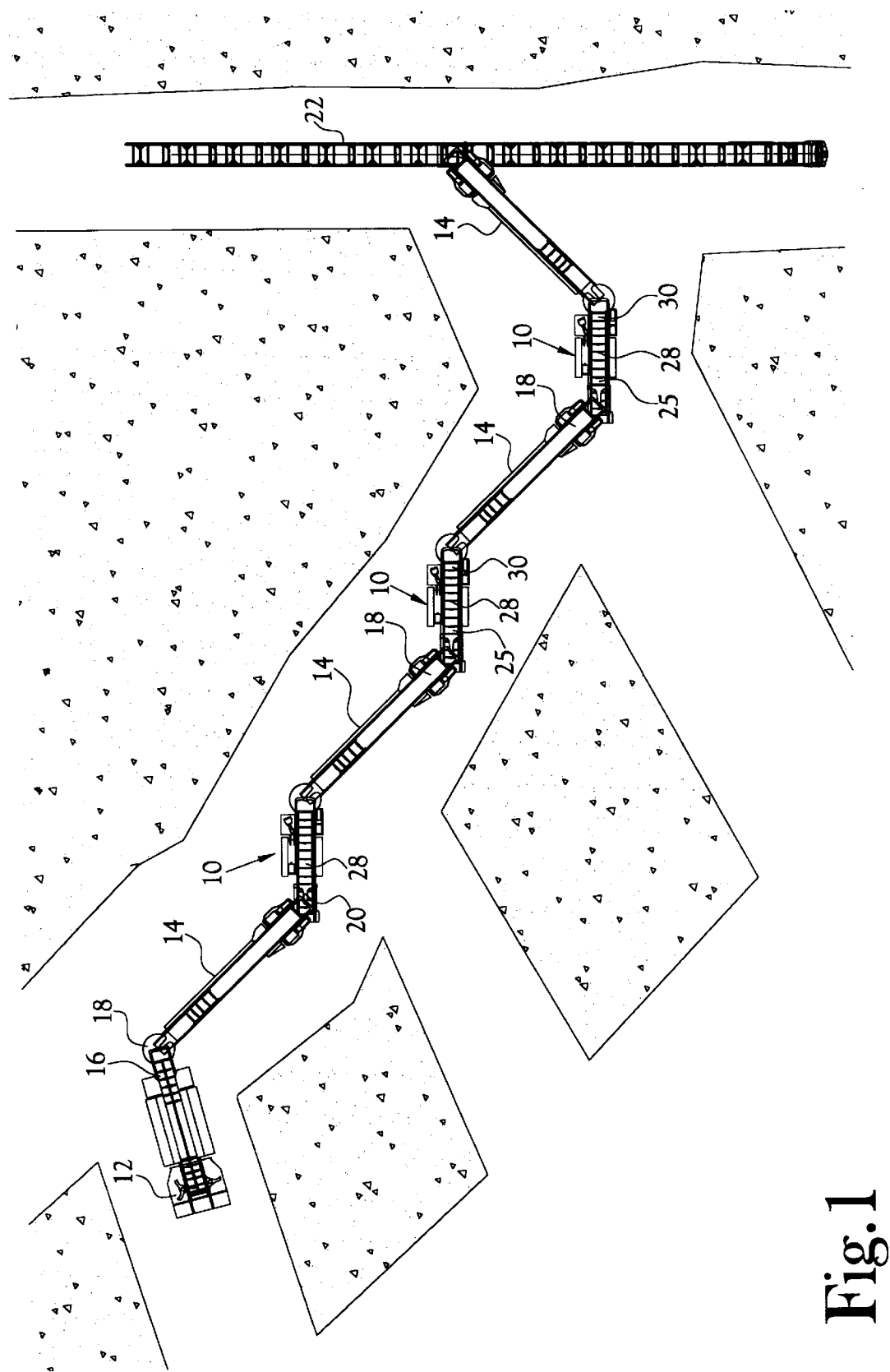
FIG. 1 illustrates a plan view of a typical haulage system utilizing a miner, a series of bridges and mobilized bridge carriers.

A mobilized bridge carrier constructed in accordance with the present invention is illustrated generally at 10 in the figures. In FIG. 1, the mobilized bridge carrier 10 is shown in use in a typical mining system. In this regard, a miner 12 cuts the coal and conveys the coal to a bridge 14, which is attached on a pin (not shown in detail) disposed at the end of the miner's conveyor 16 and has a catch pan 18 beneath the dump end of the miner's conveyor 16. The bridge 14 then conveys the mined coal to the dump end of the bridge which is supported by dolly 20 running along the top of the receiving boom 25 of the mobilized bridge carrier 10. The mined coal is then dumped onto the receiving boom 25 of the mobilized bridge carrier 10. A conveyor assembly 28 on the mobilized bridge carrier 10 conveys the mined coal to the discharge boom 30 which discharges the mined coal onto the catch pan 18 at the receiving end of the next bridge 14. In this regard, a yoke plate 32 is rigidly secured to the end of the discharge boom 30 and includes a hole member 33 which engages a pin (not shown) on the next sequential bridge 14. In the preferred embodiment, the receiving boom 25 and the discharge boom 30 each provide a channel that is at least thirty-six inches wide for conveying a larger capacity of mined coal during a given unit of time than a standard thirty inch wide low profile booms, and are referred to herein as "wide belt" or high capacity booms. This sequence is repeated until the mined coal reaches a portable belt conveyor structure 22. The portable belt conveyor 22 conveys the mined coal to the main belt line (not shown), which in turn conveys the mined coal to the opening of the mine (not shown). A typical coal mining operation uses a series of four bridge conveyors 14 and three mobilized bridge carrier 10 units.

Figure 2:
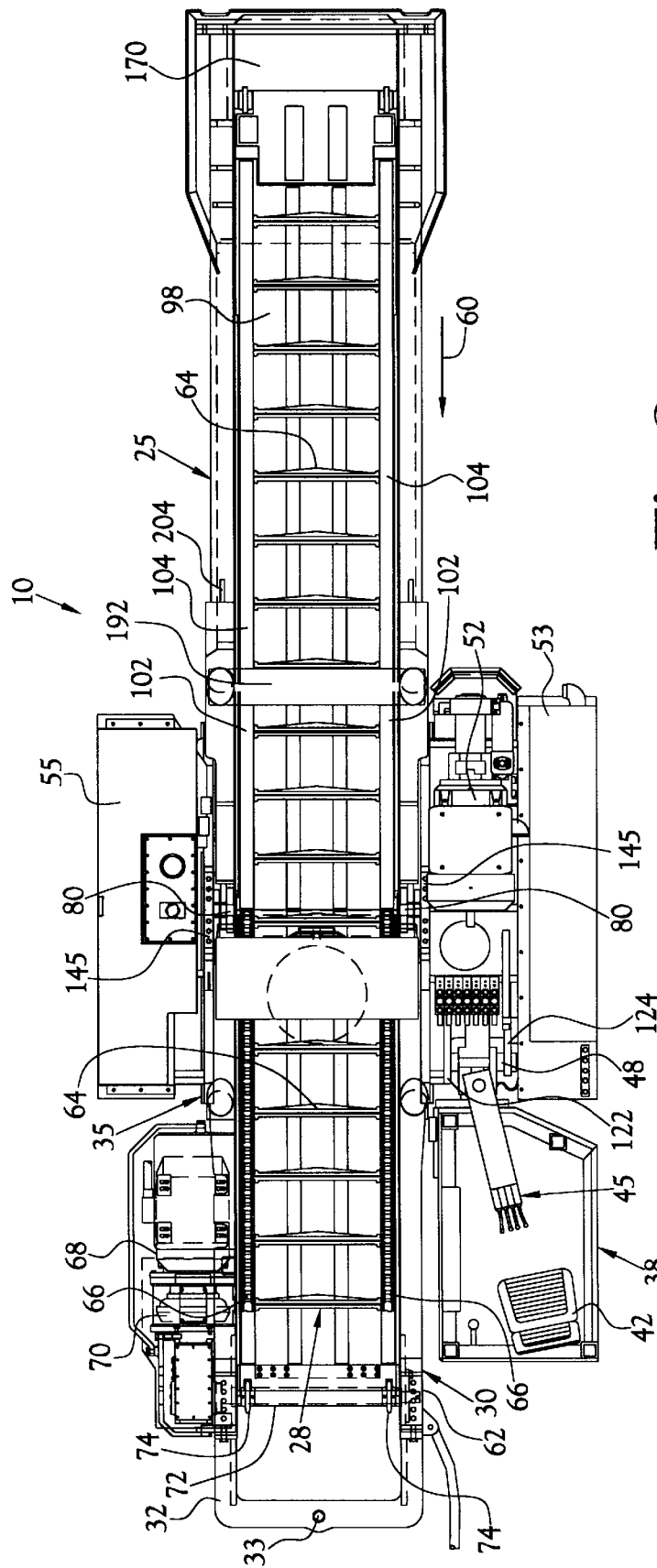
FIG. 2 illustrates a plan view of the mobilized bridge carrier of the present invention.
Figure 3:
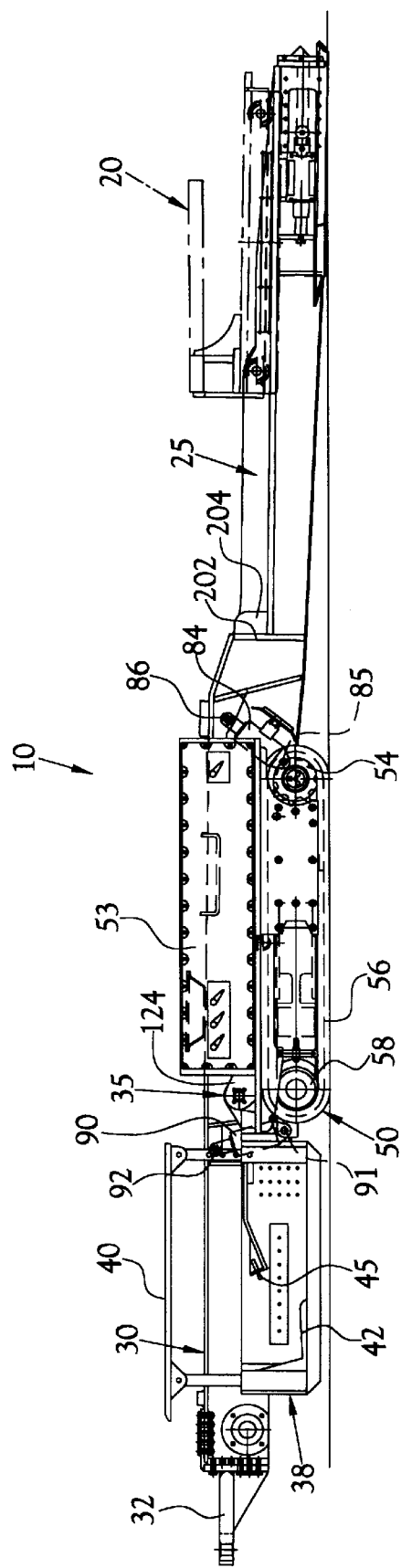
FIG. 3 illustrates a side elevation view of the mobilized bridge carrier of the present invention.

Referring to FIGS. 2 and 3, the mobilized bridge carrier 10 includes a carrier frame 35 that carries the propulsion system and that supports the receiving boom 25, the discharge boom 30 and the cab assembly 38 and canopy 40. Those skilled in the art will recognize that the canopy 40 seen in FIG. 3 has been removed from FIG. 2 for clarity of view. In this regard, the cab assembly 38 includes an operator's seat 42 and a plurality of controls 45 for controlling the operation of the mobilized bridge carrier 10. In the preferred embodiment, the cab assembly 38 is hydraulically actuated and is pivotally mounted to the carrier frame 35 on the cab float pin 48. In the preferred embodiment, the mobilized bridge carrier 10 is track propelled. In this regard, in the preferred embodiment, the mobilized bridge carrier 10 includes at least a pair of crawler track assemblies 50 which are actuated by a first motor 52, which is preferably an electrically operated hydraulic motor. Those skilled in the art will recognize that in environments where exhaust fumes can be readily exhausted to the atmosphere, other types of motors, such as internal combustion engines can be utilized. Those skilled in the art will also recognize that crawler track assembly 50 includes a track 56, a crawler drive sprocket 54 and a crawler idler roller 58, and that, in the preferred embodiment, motor 52 actuates crawler drive sprocket 54. An electrical box 53, which preferably includes a 950 volt starter, is mounted on one side of the carrier frame 35, and is supported, in part, by support bar 57. Oil tank 55, which is preferably a one hundred gallon tank, is mounted on the other side of the carrier frame 35.

As stated above, the carrier frame 35 supports both the receiving boom 25 and the discharge boom 30. In the preferred embodiment, the receiving boom 25 and the discharge boom 30 are pinned together and each are pivotally mounted on carrier frame 35 at a main pivot point 80. The main pivot point 80 and the preferred means of securing the receiving boom 25 and the discharge boom 30 to one another and the main pivot point 80 will be discussed in greater detail below. The pivotal motion of the receiving boom 25 and the discharge boom 30 are actuated by hydraulic cylinders 84 and 90, respectively. In the preferred embodiment, the hydraulic cylinder 84 engages the carrier frame 35 at anchor point 85 and engages receiving boom 25 at anchor point 86. Similarly, hydraulic cylinder 90 engages carrier frame 35 at anchor point 91 and engages discharge boom 30 at anchor point 92. The preferred hydraulic cylinders 84 and 90 have a collapsed length of fifteen and a half inches and an extended length of twenty and three quarters inches. Actuation of the hydraulic cylinders 84 and 90 is operator controlled via controls 45.

Conveyor assembly 28 conveys the coal in the direction of arrow 60. In other words, conveyor assembly 28 conveys coal received by the receiving boom 25 along the length of mobilized bridge carrier 10 to the dumping end 62 of the discharge boom 30. Conveyor assembly 28 includes a plurality of conveyor members 64 that are driven by at least a pair of endless chain members 66. It will be appreciated that only a portion of the chain members 66 and conveyor members 64 are illustrated for clarity of view. Chain members 66 are driven by a second motor 68 connected by a, preferably, fluid drive transmission 70 that drives an axle 72 which carries chain drive sprockets 74 engaged with each conveyor chain member 66. In order to maintain chain members 66 and conveyor members 64 against the floor 98 of the receiving boom when the receiving boom 25 and the discharge boom 30 are pivoted, chain hold downs 102 and 104 are provided.

Figure 4:
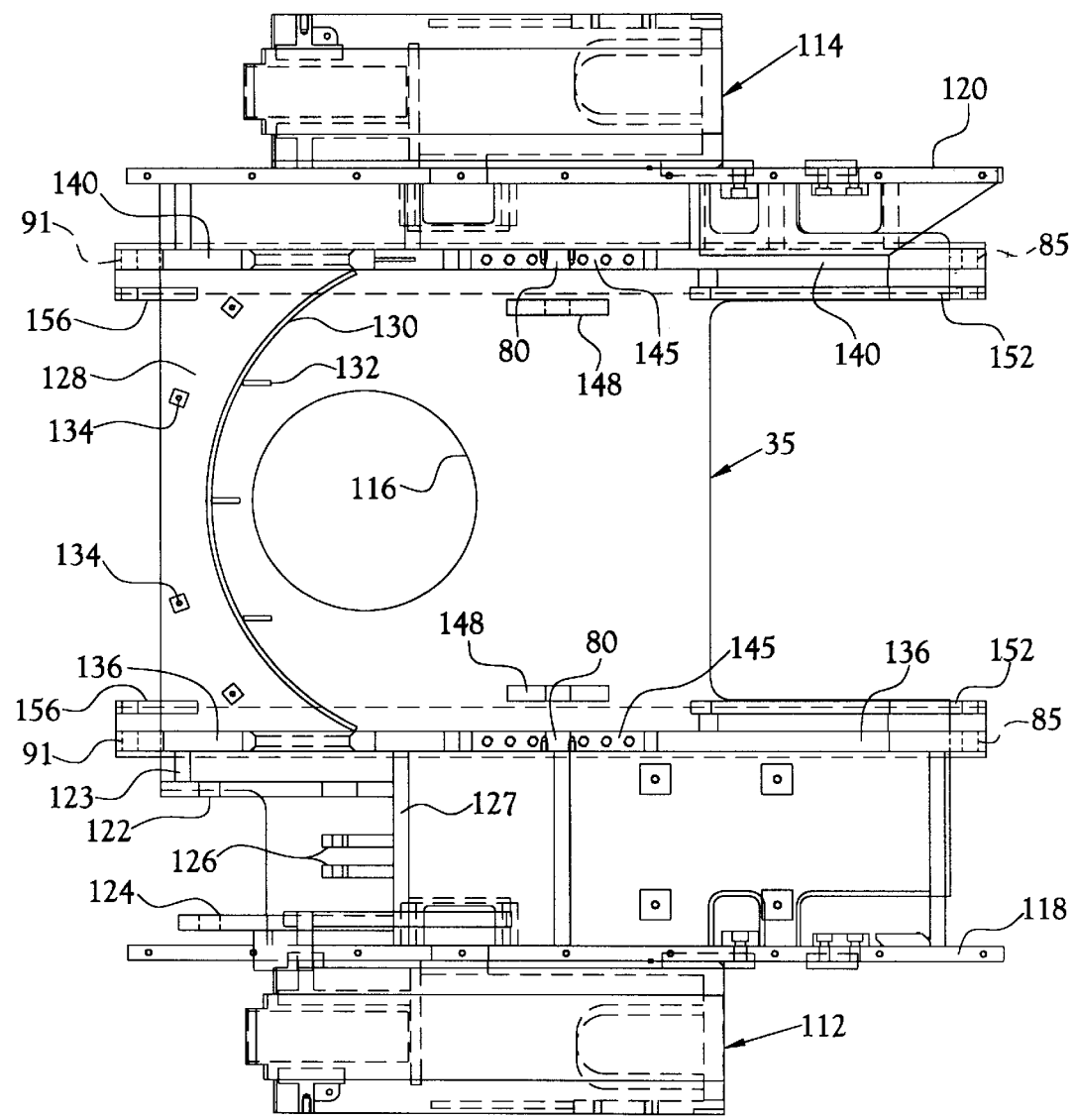
FIG. 4 illustrates a plan view of the frame of the mobilized bridge carrier illustrated in FIG. 2.
Figure 5:
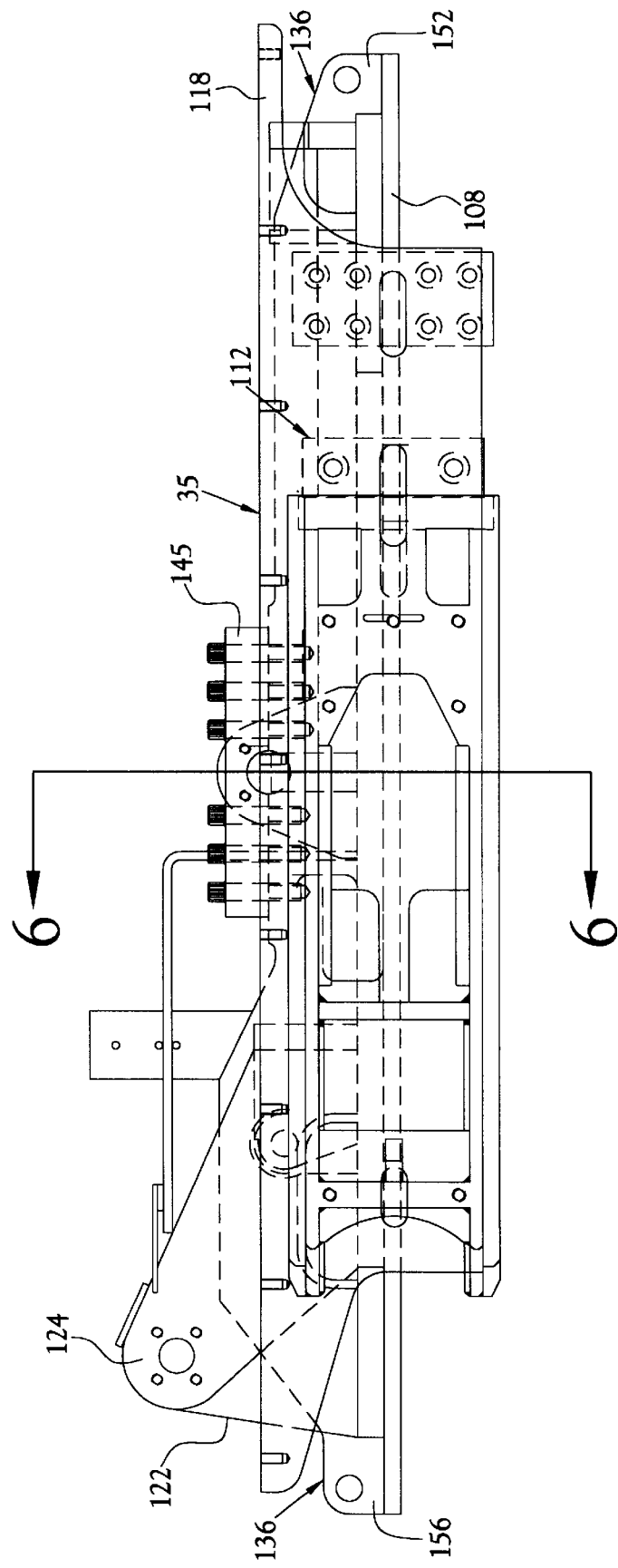
FIG. 5 illustrates a side view of the frame illustrated in FIG. 4.
Figure 6:
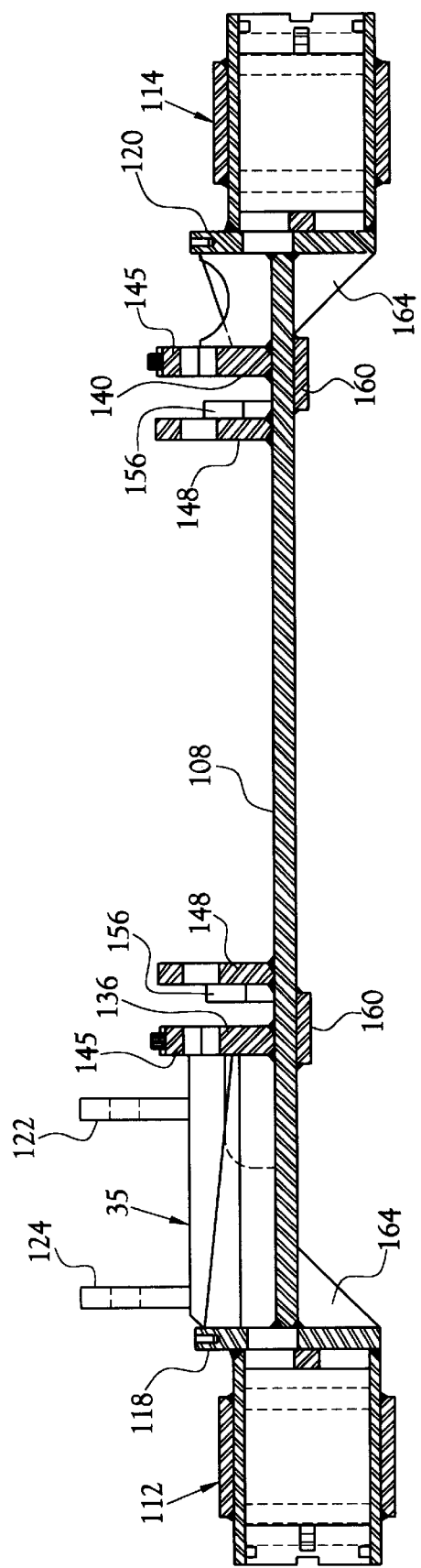
FIG. 6 illustrates a cross sectional view of the frame taken at line 6—6 in FIG. 5.
Figure 7:
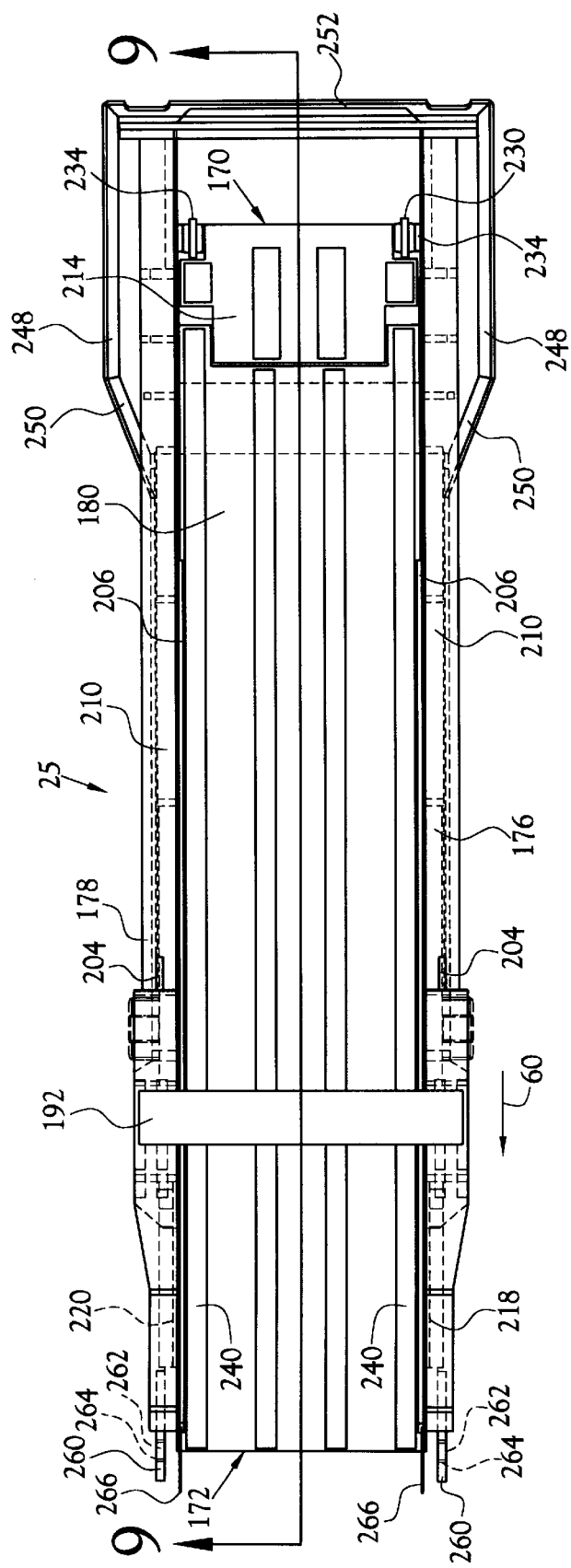
FIG. 7 illustrates a plan view of the receiving boom of the mobilized bridge carrier of the present invention, in which the dolly assembly has been removed for clarity of view.
Figure 8:
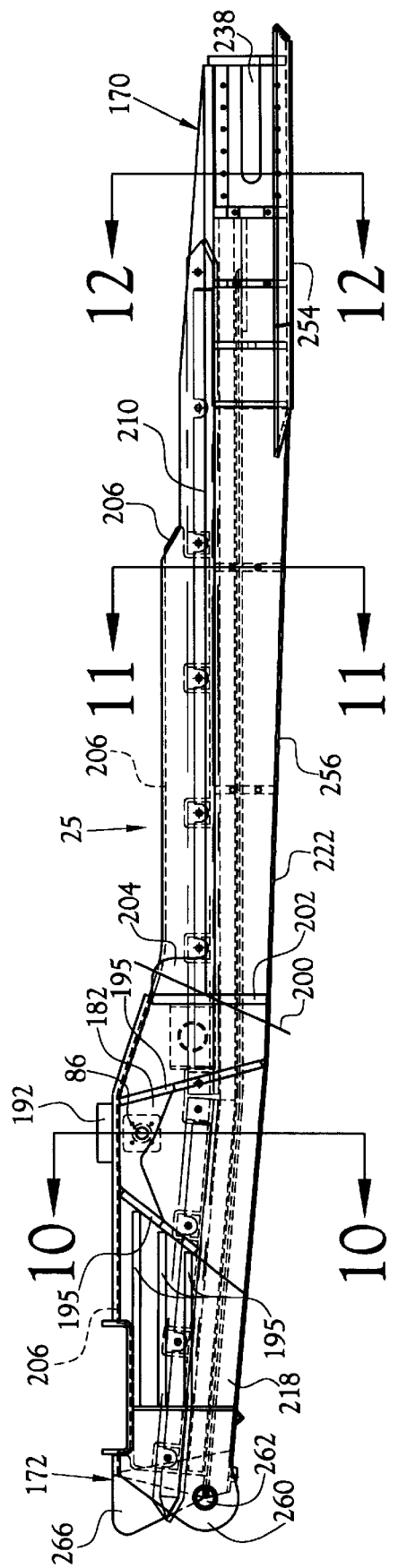
FIG. 8 illustrates a side elevation view of the receiving boom illustrated in FIG. 7.

Referring to FIGS. 4–6, the carrier frame 35 will now be described in greater detail. The carrier frame 35 for the mobilized bridge carrier 10 includes a bed plate 108 and first and second drive boxes 112 and 114 respectively. In the preferred embodiment, the bed plate is constructed of a solid plate of T1 steel and is between 1½" and 2½" thick. As those skilled in the art will recognize, coal can accumulate on bed plate 108 during use. In order to prevent a buildup of coal that could damage either the bed plate 108 or the receiving boom 25 and the discharge boom 30 when the receiving boom 25 and the discharge boom 30 are lowered, a clean-out hole 116 is provided. Drive boxes 112 and 114 house the crawler track assemblies 50. Also, carrier frame 35 supports the motor 52, the electrical box 53, and the oil tank 55. The preferred method of securement of these various components to the carrier frame 35 is a continuous weld. Drive box 112 is securely carried by the right hand mounting plate 118 which is secured to bed plate 108. Similarly, drive box 114 is securely carried by the left hand mounting plate 120 which is also secured to bed plate 108 in spaced relation from the right hand mounting plate 118. As mentioned above, the cab assembly 38 is pivotally mounted to the carrier frame 35 on the cab float pin 48. In this regard, cab float pin 48 is received in the inside and outside cab mount lug 122 and 124, respectively. A stiffener 123 is provided for inside cab mount lug 122. The hydraulic cylinder (not shown) that lifts the cab assembly 38 is anchored on the cab cylinder lug 126. Inside and outside cab mount lugs 122 and 124, and cab cylinder lug are supported, in part, by cab lug brace 127.

In order to provide a passageway for the necessary cables and hoses from one side of the carrier frame 35 to the other, and more particularly from the motor 52 to the far side drive box 114 and its associated crawler track assembly 50, a hydraulic/electrical cable trough 128 is provided. In this regard, trough 128 is disposed towards the forward end of the carrier frame 35 and is defined by an arcuate rail member 130 and associated hose guard gussets 132 and a plurality of hose guard boss blocks 134 in spaced relation from one another and from rail member 130.

The receiving boom 25 and the discharge boom 30 are supported on the carrier frame 35 by right and left hand lift and pivot lug bars 136 and 140, respectively. The receiving boom 25 and the discharge boom 30 are secured to main pivot point 80 by six-bolt mains 145 which engage and secure the boom pivot pin 78. The receiving boom 25 and the discharge boom 30 are further supported by inside pivot lugs 148. As mentioned above, hydraulic cylinder 84 engages the carrier frame 35 at anchor point 85 which is supported by the receiving boom lift lugs 152. Similarly, hydraulic cylinder 90 engages carrier frame 35 at anchor point 91 which is supported by discharge boom lift lugs 156.

As those skilled in the art will appreciate, a significant stress point exists in the bed plate 108 beneath the lift and pivot lug bars 136 and 140 and the inside pivot lugs 148. In order to compensate for this and in order to strengthen bed plate 108 and prevent torquing or twisting of the carrier frame 35, a brace plate 160 is welded to the underside of bed plate 108 proximate the position of the lift and pivot lug bars 136 and 140 and the inside pivot lugs 148. Additional braces 164 are disposed in the angle at the junction of bed plate 108 and the right and left hand mounting plates 118 and 120.

Referring to FIGS. 7–12, the receiving boom 25 will be described in greater detail. The receiving boom 25 includes a distal end 170 for receiving coal from an adjoining bridge 14, and a pivot end 172 that is pivotally connected to the discharge boom 30. In order to allow a greater range of downward pivoting of the receiving boom 25, the distal end 170 and the pivot end 172 are, preferably, disposed to one another at a substantially obtuse angle. The receiving boom 25 provides a channel, or trough, approximately thirty-six inches wide through which coal is conveyed by means of the conveyor 28. In this regard, the receiving boom 25 further includes low profile side panel assemblies 176 and 178, which are in spaced relation and a floor defined by a top conveyor plate 180. Those skilled in the art will recognize that inasmuch as one of the objects of the present invention is to provide booms having a thirty-six inch trough, having low-profile side panel assemblies reduces the inherent strength of the side walls. Accordingly, as discussed below, the receiving boom 25 includes several, novel, reinforcements, which will be discussed below.

The hydraulic cylinder anchor point 86 is defined by right hand and left hand lift lugs 182 and 184, respectively. The lift lugs 182 and 184 are carried by the right hand and left hand stiffener plates 188 and 190 respectively, which strengthen side panel assemblies 176 and 178. To further strengthen side panel assemblies 176 and 178, and to prevent side panel assemblies 176 and 178 from torquing outward when hydraulic cylinders 84 are extended, a cross brace 192 is provided. In the preferred embodiment, the cross brace 192 reinforces the right and left hand stiffener plates 188 and 190 and is disposed directly above cylinder anchor point 86. Further reinforcement of the lift lugs 182 and 184 is provided by a pair of gussets 195 associated with each of lift lugs 182 and 184. It is known that in conventional booms, a stress point is created across line 200 when the boom is lifted by the hydraulic cylinder. In order to distribute this stress over a greater surface area and reduce, if not eliminate, the onset of metal fatigue, each of the side panel assemblies 176 and 178 of the receiving boom 25 of the present invention incorporates an additional gusset 202 that intersects the stress point 200, a reinforcement plate 204 having an arcuate upper edge, and inside reinforcement plate 206. In this regard, the side panel assemblies 176 and 178 taper in height from proximate the pivot end 172 to a point of maximum height proximate cylinder anchor point 86 and then taper moderately to a point of medium height proximate the stress point 200. The inside reinforcement plate 206 extends from proximate the pivot end 172 to a point proximate the end of the dolly rail 210. In the preferred embodiment, inside reinforcement plate 206 is approximately three/fourths of an inch to approximately one inch thick plate of T1 steel continuously welded to the interior of each of the side panel assemblies 176 and 178. Each reinforcement plate 204 is positioned on its respective side panel assembly such that the arcuate upper edge of reinforcement plate 204 distributes the load associated with the stress point 200 across a greater area around the taper proximate stress point 200 rather than concentrating the load on the comer of the taper. And, in order to stiffen the distal end of the top conveyor plate 180, a stiffening plate 214 is provided at the distal end 170 of the receiving boom 25.

Additional reinforcement plates 218 and 220 are provided on the exterior of the side panel assemblies 176 and 178, respectively, proximate the pivot end 172. A bottom stiffener plate 222 provides further reinforcement.

As mentioned above, dolly 20 runs along the top of the receiving boom 25. It will be appreciated by those skilled in the art that dolly 20 is provided with the means to travel linearly with respect to receiving boom 25 in order to allow the operator of mobilized bridge carrier 10 to respond to movement of bridge 14 without damaging either bridge 14 or receiving boom 25. Dolly 20 is illustrated in FIG. 3, but has been removed from FIGS. 7–12 for clarity of view. In order to facilitate travel of the dolly 20 along the top of the receiving boom, a dolly rail 210 is provided.

Figure 9:
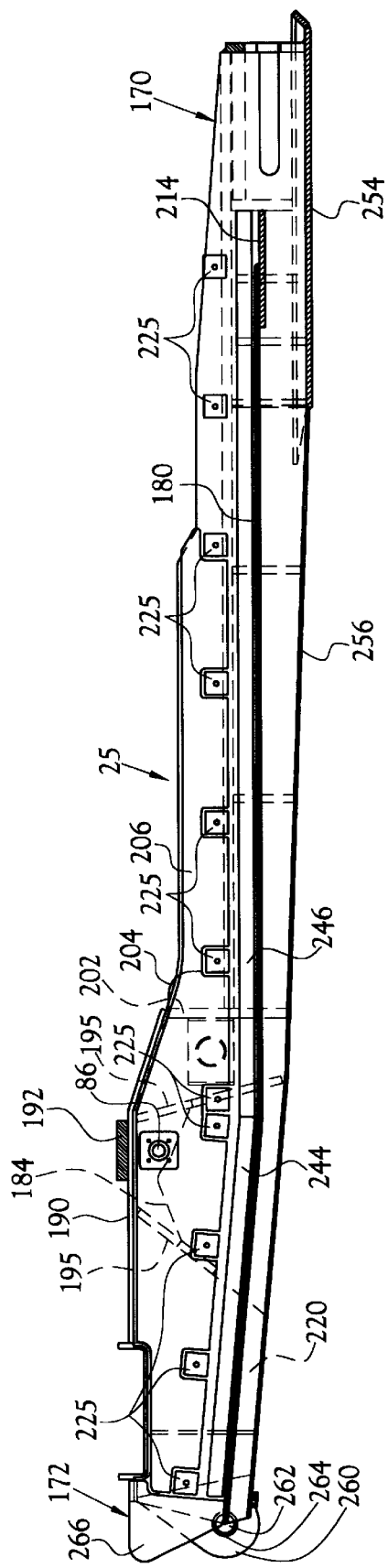
FIG. 9 illustrates a cross sectional view of the receiving boom taken at line 9—9 in FIG. 7.
Figure 12:
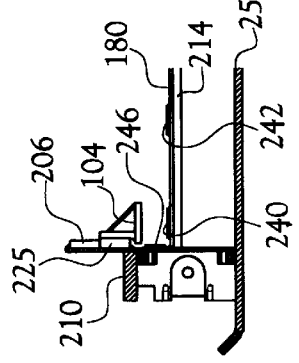
FIG. 12 illustrates a partial cross sectional view of the receiving boom taken at line 12—12 in FIG. 8.
Figure 11:
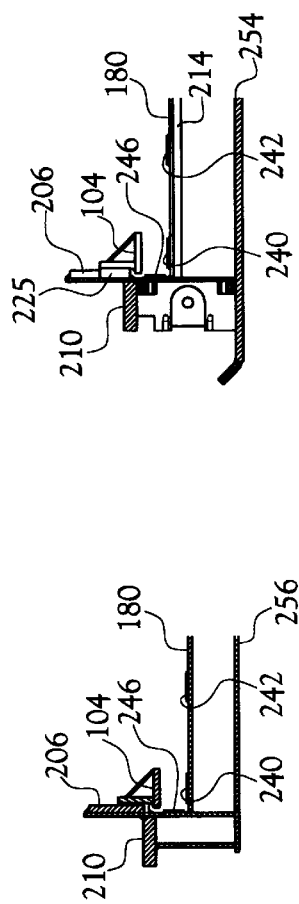
FIG. 11 illustrates a partial cross sectional view of the receiving boom taken at line 11—11 in FIG. 8.
Figure 10:
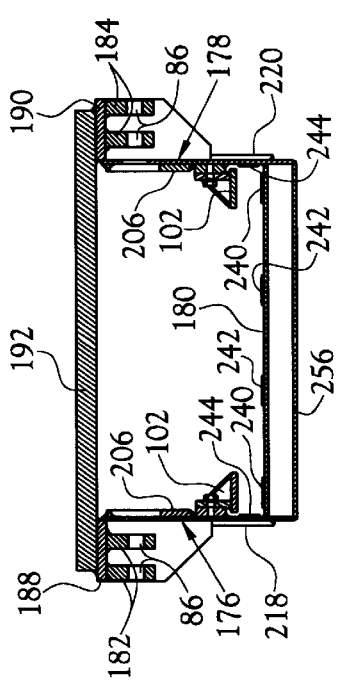
FIG. 10 illustrates a cross sectional view of the receiving boom taken at line 10—10 in FIG. 8.
Figure 13:
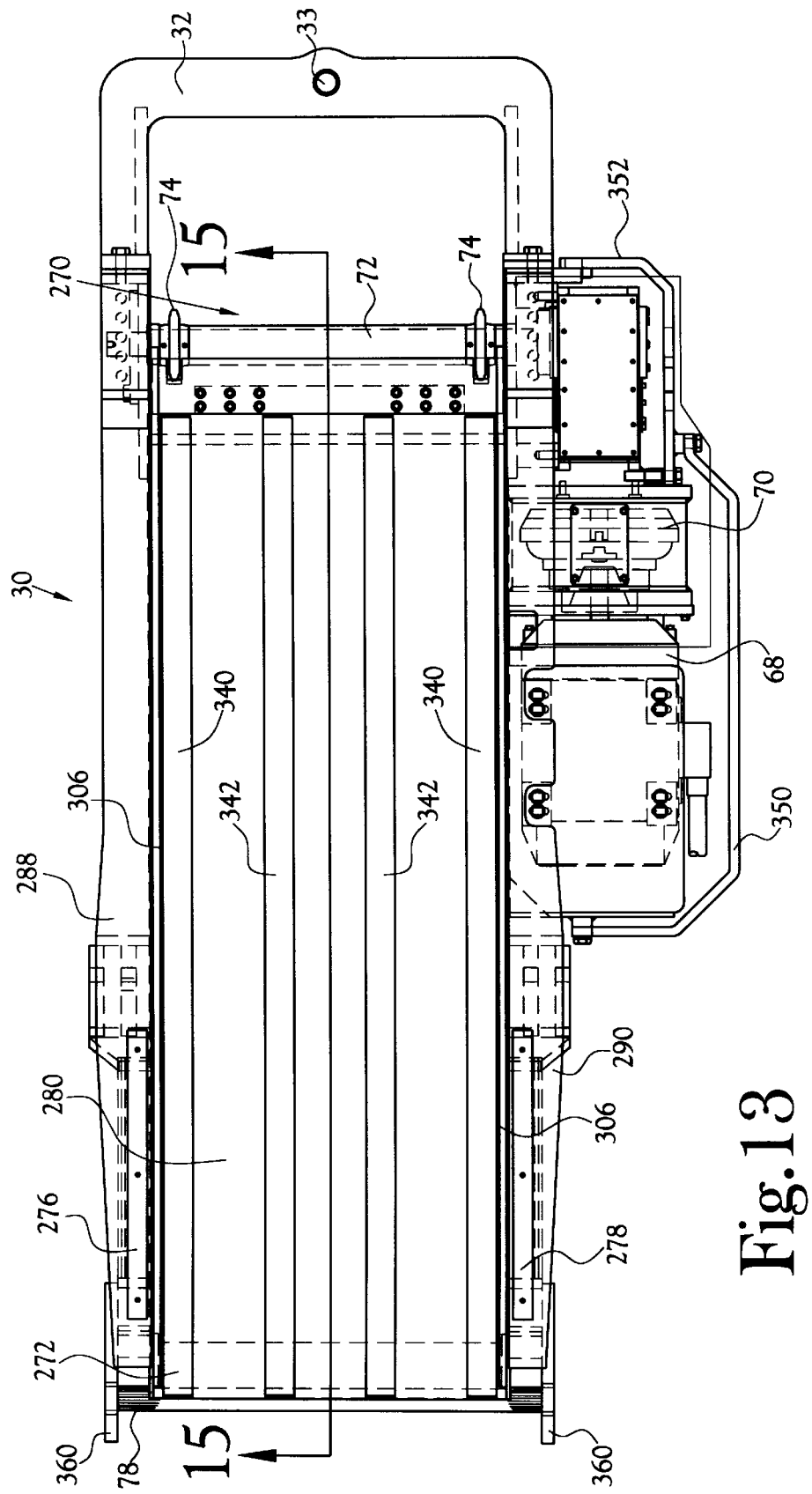
FIG. 13 illustrates a plan view of the discharge boom of the mobilized bridge carrier of the present invention.
Figure 14:
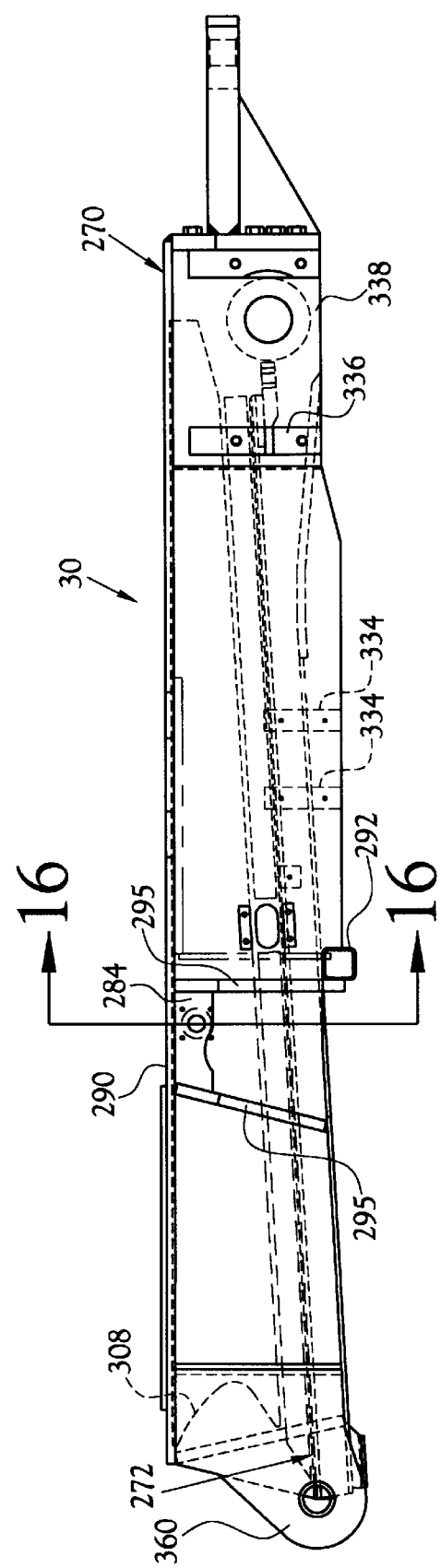
FIG. 14 illustrates a side elevation view of the discharge boom shown in FIG. 13.

As mentioned above, conveyor 28 includes a plurality of conveyor members 64 that are driven by at least a pair of endless chain members 66. The chain hold downs 102 and 104 which bias the chain members 66 against the conveyor top plate 180 of the receiving boom are not illustrated in FIG. 7 and 9 for clarity of view. Illustrated in FIG. 9 are the boss blocks 225 to which the hold downs 102 and 104 are bolted prior to being welded to the interior of the side panel assemblies 176 and 178. Chain members 66 rotate around the sprockets 230 which are carried by an axle 234. The axle 234 is supported in a device 238 disposed at the distal end 170 of the receiving boom 25. As discussed above, the conveyor 28 travels in the direction of arrow 60. In the preferred embodiment, the velocity of the conveyor 28 is approximately three hundred feet per minute. In order to prevent excessive wear to the top conveyor plate 180 by the conveyor members 64, outer floor wear strips 240 and inner floor wear strips 242 are disposed on the upper surface of the top conveyor plate 180. Side wear strips 244 and 246 reduce frictional wear to the inside of the side panel assemblies 176 and 178. In the preferred embodiment, the wear strips 240, 242, 244 and 246 are three inches wide and one-quarter of an inch thick and are constructed of T1 steel. Further, in order to protect the distal end 170 of the receiving boom 25, a pair of side deflector bars 248 and associated diagonal deflector bars 250, an end deflector bar 252 and a bottom skid plate 254 are provided. Bottom return plate 256 serves to protect chain members 66 and conveyor members 64 as they travel beneath the top conveyor plate 180 from the discharge end of the discharge boom 30 to the distal end 170 of the receiving boom 25.

As mentioned above, the receiving boom 25 and the discharge boom 30 are pinned together and each are pivotally mounted on carrier frame 35 at the main pivot point 80. In this regard, the receiving boom is provided with hinge plates 260 which are in spaced relation from one another secured proximate the pivot end 172 of the receiving boom 25. The hinge plates 260 are each provided with registering hole members 262 and a hardened steel hinge bushing 264. The hardened steel hinge bushing receives the boom pivot pin 78. Proximate the hinge plates 260 are the spill plates 266. The spill plates 266 assist in keeping the mined coal within the trough during the transition from the receiving boom 25 to the discharge boom 30.

Referring to FIGS. 13–17, the discharge boom 30 will be described in greater detail. The discharge boom 30 includes a distal end 270 for discharging coal to an adjoining bridge 14, and a pivot end 272 that is pivotally connected to the receiving boom 25. As does the receiving boom 25, the discharge boom 30 also provides a channel, or trough, approximately thirty-six inches wide through which coal is conveyed by means of the conveyor 28. In this regard, the discharge boom 30 further includes low profile side panel assemblies 276 and 278, which are in spaced relation and a floor defined by a top conveyor plate 280. Those skilled in the art will recognize that inasmuch as one of the objects of the present invention is to provide booms having a thirty-six inch trough, having low-profile side panel assemblies reduces the inherent strength of the side walls. Accordingly, as discussed below, the discharge boom 30 includes several, novel, reinforcements, which will be discussed below.

The hydraulic cylinder anchor point 92 is defined by right hand and left hand lift lugs 282 and 284, respectively. The lift lugs 282 and 284 are carried by the right hand and left hand stiffener plates 288 and 290 respectively, which strengthen side panel assemblies 276 and 278. Further reinforcement of the lift lugs 282 and 284 is provided by a pair of gussets 295 associated with each of lift lugs 182 and 184. Due to its shorter length, and therefore less torque, the discharge boom 30 is not subjected to as much stress as is the receiving boom 25, when the discharge boom 30 is lifted by the hydraulic cylinder 90. However, in order to provide additional reinforcement to discharge boom 30 a cross tube 292 is provided. Moreover, in order to reinforce the low profile side panel assemblies 276 and 278, an inside reinforcement plate 306 is provided and is rigidly fixed to the interior surface of each of the low profile side panels 276 and 278. In the preferred embodiment, inside reinforcement plate 306 is approximately three/fourths of an inch to approximately one inch thick plate of T1 steel continuously welded to the interior of each of the side panel assemblies 276 and 278. Bottom return plate 356 serves to protect chain members 66 and conveyor members 64 as they travel beneath the top conveyor plate 280 from the discharge end of the discharge boom 30 to the distal end 170 of the receiving boom 25.

As mentioned above, conveyor 28 includes a plurality of conveyor members 64 that are driven by at least a pair of endless chain members 66. Chain members 66 are in turn driven the sprockets 74 which are carried by an axle 72, which is in turn driven by the motor 68 and the fluid drive transmission 70. In this regard, the motor 68 and the fluid drive transmission 70 are carried by one of the side panel assemblies and more specifically, are supported by motor support plate 332 and are mounted on the motor mount plates 334 and the reducer mount plate 336. Additional support for the motor support plate 332 is provided by the motor support gusset 330. The motor 68 and the fluid drive transmission 70 are protected by the motor guard bar 350 and the reducer guard bar 352. The axle 72 is supported in a bearing mount plate 338 disposed at the distal end 270 of the discharge boom 30. In order to prevent excessive wear to the top conveyor plate 280 by the conveyor members 64, outer floor wear strips 340 and inner floor wear strips 342 are disposed on the upper surface of the top conveyor plate 280. Side wear strips 344 and 346 reduce frictional wear to the inside of the side panel assemblies 276 and 278. In the preferred embodiment, the wear strips 340, 342, 344 and 346 are three inches wide and one-quarter of an inch thick and are constructed of T1 steel.

As mentioned above, the receiving boom 25 and the discharge boom 30 are pinned together and each are pivotally mounted on carrier frame 30 at the main pivot point 80. In this regard, the discharge boom 30 is provided with hinge plates 360 which are in spaced relation from one another and which are secured proximate the pivot end 272 of the discharge boom 30. The hinge plates 360 are each provided with registering hole members 362 and a hardened steel hinge bushing 364 received therein. The hardened steel hinge bushing receives the boom pivot pin 78. In the preferred embodiment, the spill plates 266 carried by the receiving boom 25 are disposed so as to be positioned within the boundary of the side panel assemblies 276 and 278 of the discharge boom 30. In order to provide adequate clearance for the spill plates 366, and prevent the spill plates 366 from impinging upon the inside reinforcement plate 306 of the discharge boom, the end of the inside reinforcement plate 306 proximate the pivot end 272 of the discharge boom is provided with a cut-out 308. The cut-out 308 provides clearance for the spill plates 366 as the receiving boom 25 and/or the discharge boom 30 are pivoted.

From the foregoing description, it will be recognized by those skilled in the art that a low vein mobilized bridge carrier, providing a wide conduit for conveying mined coal from one bridge to another bridge and for carrying coal bridges through a mine offering advantages over the prior art has been provided. Specifically, the low vein mobilized bridge carrier provides a low profile mobilized bridge carrier having a wide belt for greater haulage capacity than presently available systems and that has low profile reinforced booms.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. A low-profile mobilized bridge carrier, said low profile mobilized bridge carrier comprising:

a carrier frame including a bed plate having first and second sides and first and second drive boxes secured to said bed plate in spaced relation;

a first motor means, wherein said first motor means is carried by said carrier frame;

at least a pair of crawler track assemblies carried by said carrier frame for propelling said mobilized bridge carrier, each of said pair of crawler track assemblies including a track, a crawler drive sprocket actuated by said first motor means and a crawler idler roller, wherein each of said pair of crawler track assemblies is supported by said first and second drive boxes;

a wide belt receiving boom supported by said carrier frame, said receiving boom including a distal end and a pivot end, a pair of reinforced side panel assemblies in spaced relation and a floor disposed between said pair of side panel assemblies, said receiving boom further including a first interior reinforcement plate secured to an interior surface of each of said pair of side panel assemblies;

a wide belt discharge boom supported by said carrier frame, said discharge boom including a distal end and a pivot end, a pair of reinforced side panel assemblies in spaced relation and a floor disposed between said pair of side panel assemblies, wherein said pivot end of said discharge boom is pivotally secured to said pivot end of said receiving boom by a boom pin with a horizontal axis wherein said pivot ends of said receiving boom and said discharge boom are pivotally secured to said carrier frame at a main pivot point, said main pivot point including at least a pair of six-bolt mains carried by said carrier frame in spaced relation for securing said boom pin, wherein said main pivot point is supported on said bed plate by first and second pairs of pivot lug bars, wherein said first and second pairs of pivot lug bars are positioned to receive and support said boom pin, wherein said discharge boom further includes a second interior reinforcement plate secured to an interior surface of each of said pair of side panel assemblies;

at least one ram for actuating said receiving boom, each of said at least one ram having a first end anchored to a first anchor point disposed on said carrier frame and a second end secured to a lift point on said receiving boom, wherein said first anchor point is supported by a first pair of lift lugs;

at least one ram for actuating said discharge boom, each of said at least one ram having a first end anchored to a second anchor point disposed on said carrier frame and a second end secured to a lift point on said discharge boom, wherein said second anchor point is supported by a second pair of lift lugs;

means for conveying mined coal from said distal end of said receiving boom to said distal end of said discharge boom; and a second motor means for actuating said conveyor assembly.

2. The mobilized bridge carrier of claim 1 wherein said cab assembly includes an operator's seat and a plurality of controls for controlling operation of said mobilized bridge carrier, and further wherein said cab assembly is pivotally mounted to said carrier frame and is hydraulically actuated.

3. The mobilized bridge carrier of claim 1 wherein said first motor means is defined by an electrically operated hydraulic motor.

4. The mobilized bridge carrier of claim 1 wherein said at least one ram for actuating said receiving boom and said at least one ram for actuating said discharge boom are defined by hydraulic rams.

5. The mobilized bridge carrier of claim 4 wherein said hydraulic rams each have a collapsed length of fifteen and a half inches and an extended length of twenty and three quarters inches.

6. The mobilized bridge carrier of claim 1 wherein said receiving boom further includes chain hold down members disposed proximate said floor in spaced relation for biasing said endless chain members against said floor.

7. The mobilized bridge carrier of claim 1 wherein said bed plate is constructed of a solid plate of T1 steel and is in a range of approximately 1½" to approximately 2½" thick.

8. The mobilized bridge carrier of claim 1 wherein said bed plate is provided with a centrally disposed clean out hole.

9. The mobilized bridge carrier of claim 1 wherein said first and second drive boxes are secured to mounting plates carried by said bed plate, and wherein said bed plate further includes a cable trough defined by an arcuate rail member and a plurality of hose guard gussets in spaced relation from one another and from said arcuate rail member for providing a passageway for cables to extend from said first side of said bed plate to said second side of said bed plate.

10. The mobilized bridge carrier of claim 1 wherein said bed plate further includes at least a first brace plate welded to an underside of said bed plate proximate the position of said first and second pivot lug bars and at least a second brace plate disposed at a junction of said bed plate and said mounting plates, said first and second brace plates for preventing torquing of said carrier frame.

11. The mobilized bridge carrier of claim 1 wherein said receiving boom includes a lift point disposed on each of said pair of side panel assemblies, wherein each of said lift points is defined by lift lugs carried by stiffener plates secured to each of said pair of side panel assemblies, wherein said stiffener plates provide reinforcement to said pair of side panel assemblies.

12. The mobilized bridge carrier of claim 11 wherein said receiving boom further includes a cross brace for reinforcing said stiffener plates, wherein said cross brace is disposed above said lift points of said receiving boom.

13. The mobilized bridge carrier of claim 1 wherein said receiving boom includes a stress point disposed proximate said lift points and further wherein said receiving boom further includes at least a first pair of gussets disposed on each of said pair of side panel assemblies proximate said lift points and a reinforcement plate having an arcuate upper edge disposed on each of said pair of side panel assemblies disposed such that said arcuate upper edge distributes a load force associated with said stress point across said reinforcement plate thereby reinforcing said receiving boom.

14. The mobilized bridge carrier of claim 1 wherein said receiving boom further includes a dolly rail disposed on each of said pair of side panel assemblies proximate said distal end of said receiving boom.

15. The mobilized bridge carrier of claim 13 wherein said discharge boom includes a lift point disposed on each of said pair of side panel assemblies, wherein each of said lift points is defined by lift lugs carried by stiffener plates secured to each of said pair of side panel assemblies, wherein said stiffener plates provide reinforcement to said pair of side panel assemblies, and wherein said discharge boom further includes at least a second pair of gussets disposed on each of said pair of side panel assemblies proximate said lift points.

16. The mobilized bridge carrier of claim 15 wherein said first and said second interior reinforcement plates, said gussets, and said reinforcement plates having said arcuate upper edge are each constructed of T1 steel.

17. The mobilized bridge carrier of claim 1 wherein said second motor means for actuating said conveyor assembly is carried by said discharge boom.

18. The mobilized bridge carrier of claim 1 wherein said means for conveying mined coal is defined by a conveyor assembly, said conveyor assembly including at least a pair of endless chain members, and a plurality of conveyor members carried by said endless chain members for engaging the mined coal, a first axle disposed at said distal end of said discharge boom, a first pair of sprocket members carried by said first axle in spaced relation for engaging said endless chain members, a second axle disposed at said distal end of said receiving boom, and a second pair of sprocket members carried by said second axle in spaced relation for engaging said endless chain members.

19. The mobilized bridge carrier of claim 1 wherein said mobilized bridge carrier further comprises a cab assembly, including a canopy for covering said cab assembly, wherein said cab assembly is carried by said carrier frame.

\* \* \* \* \*